United States Patent
Kanemoto (10) Patent No.: US 9,193,070 B2
(45) Date of Patent: Nov. 24, 2015

(54) ROBOT, CONTROL SYSTEM FOR CONTROLLING MOTION OF A CONTROLLED OBJECT, AND RECORDING MEDIUM FOR CONTROL PROGRAM FOR CONTROLLING MOTION OF A CONTROLLED OBJECT

(75) Inventor: Yoshiki Kanemoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 674 days.

(21) Appl. No.: 13/086,850

(22) Filed: Apr. 14, 2011

(65) Prior Publication Data

US 2011/0264265 A1 Oct. 27, 2011

(30) Foreign Application Priority Data

Apr. 26, 2010 (JP) ................. 2010-101491

(51) Int. Cl.
*B25J 9/16* (2006.01)

(52) U.S. Cl.
CPC ..... *B25J 9/1666* (2013.01); *G05B 2219/34141* (2013.01); *G05B 2219/34175* (2013.01); *G05B 2219/40428* (2013.01); *G05B 2219/40449* (2013.01); *G05B 2219/40476* (2013.01); *G05B 2219/40512* (2013.01); *G05B 2219/40519* (2013.01)

(58) Field of Classification Search
CPC ................. B25J 9/1666; B25J 9/1664; G05B 2219/34141; G05B 2219/40428; G05B 2219/34175; G05B 2219/40476; G05B 2219/40449; G05B 2219/40512; G05B 2219/40519

USPC .......... 700/189, 245–264; 318/570, 573, 569; 901/1, 2, 28, 29
See application file for complete search history.

(56) References Cited

U.S. PATENT DOCUMENTS 6,216,058 B1 * 4/2001 Hosek et al. .................. 700/245

OTHER PUBLICATIONS

James Kuffner, Satoshi Kagami et al, "Dyamically-stable Motion Planning for Humanoid Robots", Autonomous Robots vol. 12 No. 1, pp. 105-118, Jan. 2002. Pages are labeled 1-21.*
Enzhong Shan et al, An Dynamic RRT Path Planning Algorithm Based on B-Spline, 2009 Second International Symposium on Computational Intelligence and Design, pp. 25-29.*

(Continued)

*Primary Examiner* — Khoi Tran
*Assistant Examiner* — Abby Lin
(74) *Attorney, Agent, or Firm* — Rankin, Hill & Clark LLP (57) ABSTRACT

A system and the like capable of maintaining the continuity or smoothness in the motion of a controlled object. According to a control system 1 and a robot R, which is a controlled object thereof, of the present invention, a desired position trajectory is generated by performing an interpolation process of generating a line segment represented by a linear combination of point sequences disposed in a model space with a basis function for spatial interpolation as a coupling coefficient. Therefore, a line segment, which continuously and smoothly connects the starting point and the end point, represented by a linear combination of a plurality of points (control points), instead of a broken line passing through the plurality of points disposed in the model space.

4 Claims, 6 Drawing Sheets

(56) References Cited

OTHER PUBLICATIONS

Coolmath.com, "Lines Bonus Online-only Lesson—What is a Line?", Coolmath Algebra Help Lessons.*

"RRT-Connect: An Efficient Approach to Single-Query Path Planning", James J. Kuffner et al., In proc. 2000 IEEE Int'l Conf. on Robotics and Automation (ICRA 2000), (Discussed on p. 1 of specification.).

* cited by examiner

ROBOT, CONTROL SYSTEM FOR CONTROLLING MOTION OF A CONTROLLED OBJECT, AND RECORDING MEDIUM FOR CONTROL PROGRAM FOR CONTROLLING MOTION OF A CONTROLLED OBJECT

BACKGROUND OF THE INVENTION

1. Field of the Invention

The present invention relates to a control system, a robot, which is one of controlled objects of the control system, and the like.

2. Description of the Related Art

As an approach for searching for a macroscopic position trajectory of a controlled object such as a robot, there has been suggested an RRT-Connect (Refer to Knuffer et al. "An Efficient Approach to Single-Query Route Planning," In Proc. 2000 IEEE Int'l Conf. on Robotics and Automation (ICRA 2000)).

SUMMARY OF THE INVENTION

Figure 5A:
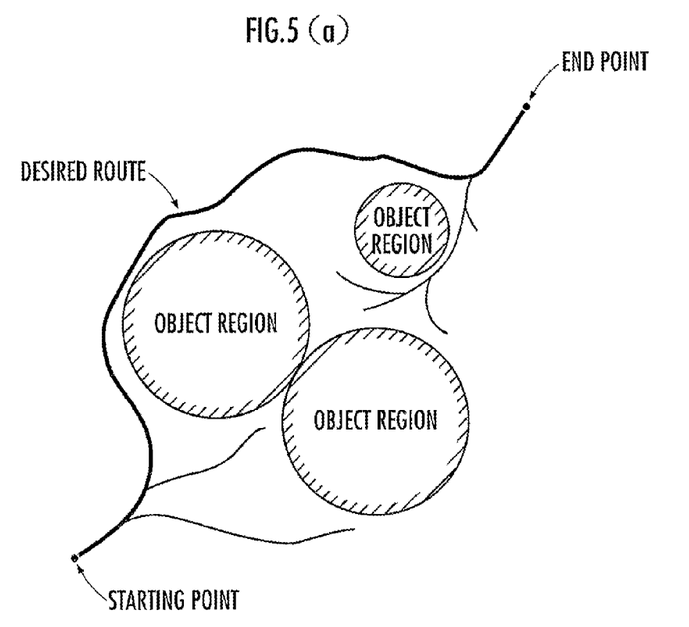
FIG. 5 is an explanatory diagram of an embodiment of generating a position trajectory.
Figure 5B:
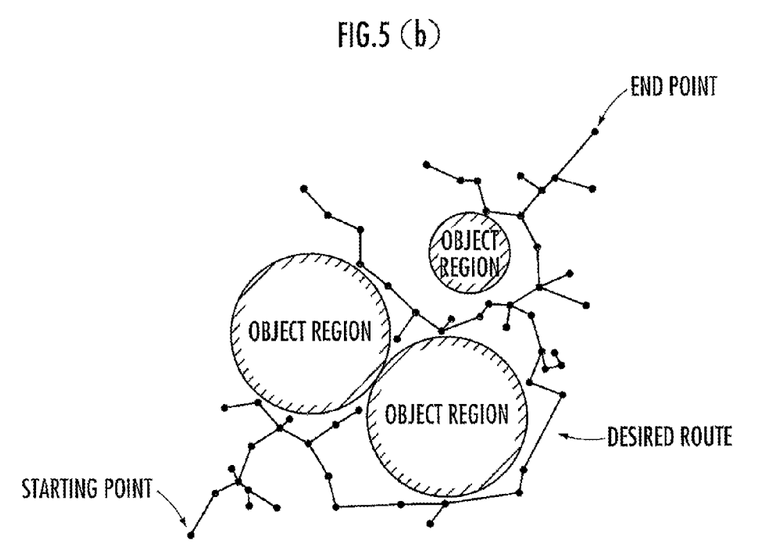

According to the RRT-Connect approach, however, normally a broken-line position trajectory is output as a search result. FIG. 5(b) illustrates a desired position trajectory generated in such a way as to avoid obstacles by using the RRT-Connect approach. Therefore, when the robot moves its hand with the output as a desired position trajectory, the hand may need to stop or decelerate significantly in order to change the moving direction at a broken point or short thereof on the position trajectory. This leads to discontinuous speed or acceleration of the hand, which might ruin the continuity or smoothness in the motion of the robot.

Therefore, it is an object of the present invention to provide a system and the like capable of maintaining the continuity or smoothness in the motion of a controlled object.

In order to achieve the above object, the present invention provides a control system for controlling the motion of a controlled object so as to displace the controlled object or a specified portion thereof according to a desired position trajectory defined in a model space representing a real space, the system including: a first arithmetic processing element configured to perform an extension process of generating a new line segment, where one line segment is extended by an extension line segment, by performing an interpolation process of generating a line segment represented by a linear combination of point sequences with a basis function for spatial interpolation as a coupling coefficient on the basis of the point sequences disposed distant from each other in the model space and performing the interpolation process with a new point sequence as a basis after defining the new point sequence by adding a point to the point sequence, which is the basis of the one line segment generated by the interpolation process; and a second arithmetic processing element configured to perform a connection process of generating a line segment in a form where the one line segment and another line segment are connected via a connection line segment as the desired position trajectory or a candidate therefor by performing the interpolation process with a basis of the new point sequence, which is the basis of the one line segment extended last by performing the extension process by the first arithmetic processing element, and another point sequence, which is the basis of another line segment generated by the interpolation process.

According to the control system of the present invention, the desired position trajectory or a candidate therefor is generated by performing the interpolation process of generating a line segment represented by a linear combination of point sequences disposed in a model space with a basis function for spatial interpolation as a coupling coefficient. The line segment may be either of a straight line and a curve. Therefore, instead of a broken line passing through each of the plurality of points disposed in the model space, a line segment continuously or smoothly connecting the starting point and the end point, which is represented by a linear combination of the plurality of points (control points), is generated as the desired position trajectory or a candidate therefor of the controlled object. This enables the continuity or smoothness in the motion of the controlled object on the desired position trajectory to be maintained.

The first arithmetic processing element may be configured to perform a first determination process of determining whether, in the model space, the extension line segment satisfies a specified condition including that the extension line segment is outside an object region, which represents an object in a real space, and configured to perform the extension process after rejecting the one line segment with a requirement that the result of the first determination process is negative.

The second arithmetic processing element may be configured to perform a second determination process of determining whether, in the model space, the connection line segment satisfies a specified condition including that the connection line segment is outside an object region, which represents an object in a real space, and configured to perform the extension process after the first arithmetic processing element redefines the new point sequence with a requirement that the result of the second determination process is negative.

The control system having the configuration is able to avoid a contact with an obstacle while maintaining continuity or smoothness in the motion of the controlled object on the desired position trajectory as described above.

In order to achieve the above object, the present invention provides a recording medium for a control program, the recording medium storing a program, which causes a computer mounted on a controlled object to function as the control system.

In order to achieve the above object, the present invention provides a robot as the controlled object, which has a body and limbs extended from the body and is configured to perform a task by moving the limbs, wherein the robot includes the control system.

The robot according to the present invention is able to move on the desired position trajectory with continuity or smoothness maintained.

DESCRIPTION OF THE PREFERRED EMBODIMENTS

Preferred embodiments of a control system and a controlled object thereof according to the present invention will be described with reference to accompanying drawings.

(Configuration of Robot)

First, the following describes the configuration of a robot as one embodiment of the controlled object of the present invention.

Figure 1:
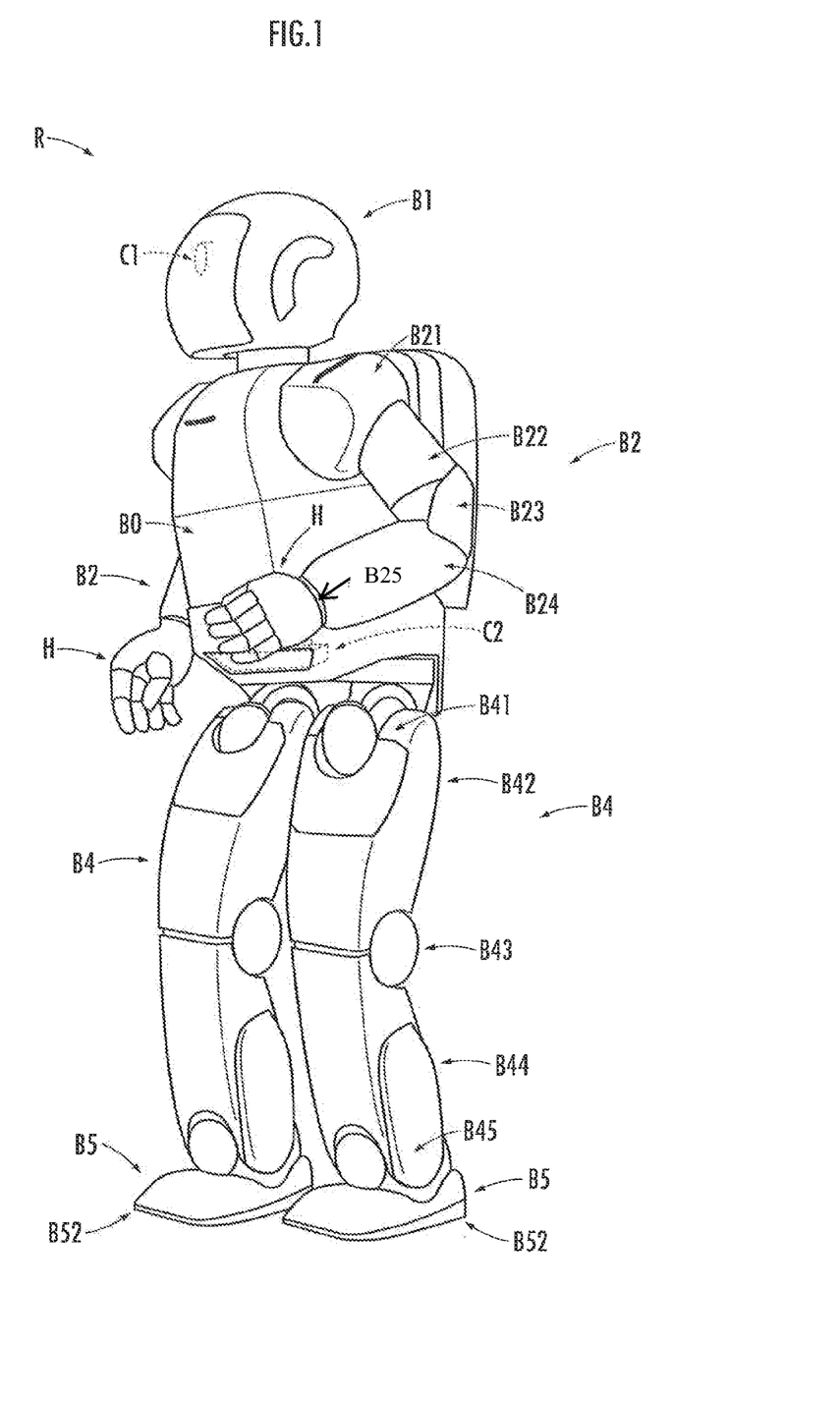
FIG. 1 is a configuration schematic diagram of a robot as one embodiment of the present invention.

The robot R illustrated in FIG. 1 is a legged mobile robot. In the same manner as a human, the robot R has a body B0, a head B1 disposed above the body B0, left and right arms B2 extended from both sides of the body B0 in the upper parts thereof, hands H provided at the distal ends of the left and right arms B2, respectively, and left and right legs B4 extending downward from the bottom of the body B0.

The body B0 is composed of the upper and lower parts vertically connected so as to relatively rotate around the yaw axis. The head B1 is able to move, such as to rotate around the yaw axis relative to the body B0.

The arm B2 has a first arm link B22 and a second arm link B24. The body B0 and the first arm link B22 are connected to each other via a shoulder joint mechanism (a first arm joint mechanism) B21, the first arm link B22 and the second arm link B24 are connected to each other via an elbow joint mechanism (a second arm joint mechanism) B23, the second arm link B24 and the hand H are connected to each other via a wrist joint mechanism (a third arm joint mechanism) B25. The shoulder joint mechanism B21 has rotational degrees of freedom around the roll, pitch, and yaw axes, the elbow joint mechanism B23 has a rotational degree of freedom around the pitch axis, and the wrist joint mechanism B25 has rotational degrees of freedom around the roll, pitch, and yaw axes.

The leg B4 has a first leg link B42, a second leg link B44, and a foot B5. The body B0 and the first leg link B42 are connected to each other via a hip joint mechanism (a first leg joint mechanism) B41, the first leg link B42 and the second leg link B44 are connected to each other via a knee joint mechanism (a second leg joint mechanism) B43, and the second leg link B44 and the foot B5 are connected to each other via a foot joint mechanism (a third leg joint mechanism) B45.

The hip joint mechanism B41 has rotational degrees of freedom around the roll, pitch, and yaw axes, the knee joint mechanism B43 has a rotational degree of freedom around the pitch axis, and the foot joint mechanism B45 has rotational degrees of freedom around the roll and pitch axes. The hip joint mechanism B41, the knee joint mechanism B43, and the foot joint mechanism B45 constitute a leg joint mechanism group. The translational and rotational degrees of freedom of the joint mechanisms included in the leg joint mechanism group may be appropriately changed. Moreover, arbitrary one of the hip joint mechanism B41, the knee joint mechanism B43, and the foot joint mechanism B45 may be omitted and then the remaining two joint mechanisms may be combined to constitute the leg joint mechanism group. Moreover, if the leg B4 has a second leg joint mechanism other than the knee joint, the leg joint mechanism group may be constituted so as to include the second leg joint mechanism. The sole of the foot B5 is provided with an elastic material B52 as disclosed in Japanese Patent Application Laid-Open No. 2001-129774 in order to absorb shock at landing.

The robot R is equipped with a plurality of internal state sensors $S_1$ for use in measuring the internal states such as the position and posture on the world coordinate system of the robot R. An encoder (not illustrated), which outputs signals corresponding to the flexion angles (joint angles) of the joint mechanisms of the robot R, an inclination sensor, which outputs a signal corresponding to the posture (identified by an azimuth angle and an elevation angle) of the body B0, and a pressure sensor, which determines pressure on the foot B5 and whether the foot B5 lands on the floor or leaves the floor, correspond to the internal state sensors $S_1$. An imaging device corresponds to the internal state sensor $S_1$, where the imaging device is used to recognize the position of the robot R in the world coordinate system by taking images of the surroundings of the robot R to recognize the position of the indicators fixed to the world coordinate system on the basis of the imaging coordinates.

For example, the imaging device may be a pair of left and right head cameras C1, which are mounted on the head B1 and capable of sensing light in various frequency bands, such as CCD cameras or infrared cameras, for taking images in front of the robot R. Moreover, the imaging device may be a waist camera (active sensor) C2, which is mounted on the front-side lower part of the body B0 to measure the position and orientation of an object by detecting the reflected light of near-infrared laser light from the object emitted to the forward lower side of the robot R.

The robot R is equipped with an external state sensor $S_2$ for measuring an external state such as the position of an object in the surroundings of the robot R. Any of the imaging devices as described above corresponds to the external state sensor $S_2$.

The robot R has a computer, which forms a part of a control system 1, and a plurality of actuators 2 for use in moving the plurality of joint mechanisms. The respective motions of the actuators 2 are controlled according to control commands output from the control system 1 according to the internal state and the external state of the robot R, thereby enabling the robot R to act adaptively in various modes.

In addition, besides the robot R (See FIG. 1), the controlled object may be any kind of device, such as a vehicle, with the motion that is controlled so as to be displaced partially or entirely according to a desired position trajectory.

(Configuration of Control System)

Figure 2:
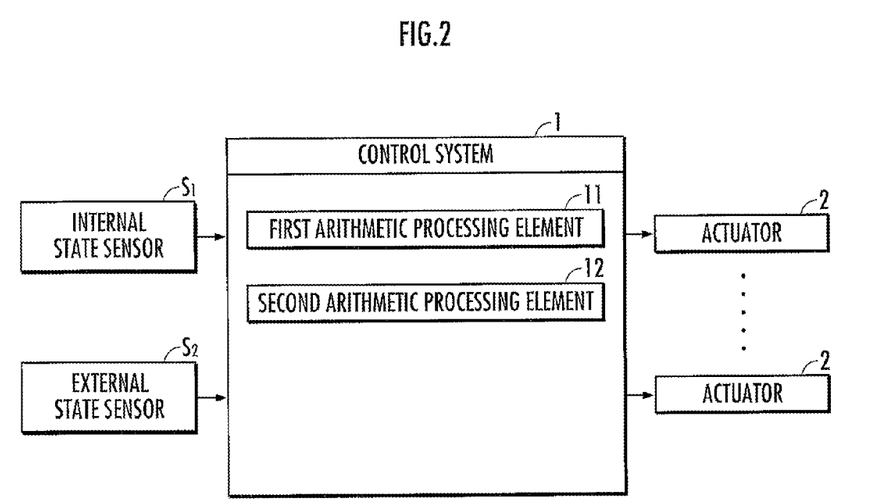
FIG. 2 is a configuration schematic diagram of a control system for the robot.

The control system 1 illustrated in FIG. 2 is composed of a computer mounted on the robot R. The control system 1 has a first arithmetic processing element 11 and a second arithmetic processing element 12 each configured to perform an arithmetic process described later.

Each of the first arithmetic processing element 11 and the second arithmetic processing element 12 is composed of a programmable computer as a hardware resource. The first arithmetic processing element 11 and the second arithmetic processing element 12 may be composed of physically common hardware resources and be composed of hardware resources physically, at least partially, different from each other.

The description that the arithmetic processing element is configured to perform an arithmetic process means that the processor constituting the arithmetic processing element is programmed so as to read necessary software from the memory and to execute the software to perform the arithmetic process. The program is installed into the computer, using a recording medium such as a CD or a DVD, or downloaded from a server computer having a storage device, which stores the program temporarily or constantly, or through a recording medium of a broadcasting station or the like.

(Functions of Robot)

Figure 6:
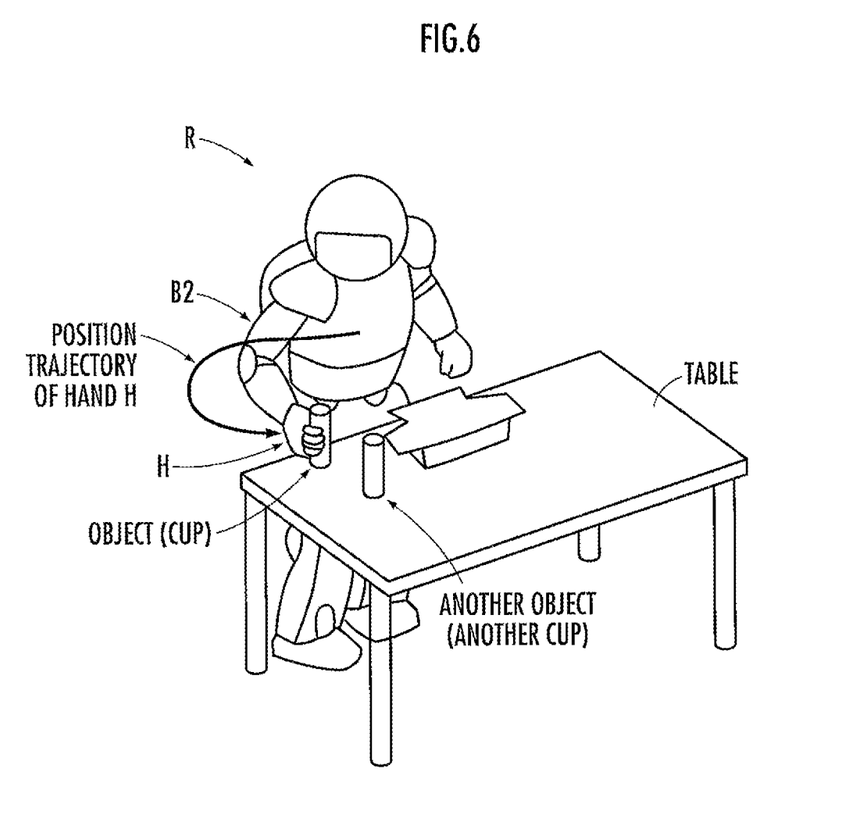
FIG. 6 is an explanatory diagram of the motion of the robot.

The functions of the robot R and the control system 1 having the above configurations will be described below. Here, the following describes a motion control, for example, as illustrated in FIG. 6, supposing that the robot R performs a task of moving the arm B2 to move a cup held by the hand H so that both of the hand H and the cup do not come in contact with any other cup placed on the table and then to put down the cup on the table.

Figure 3:
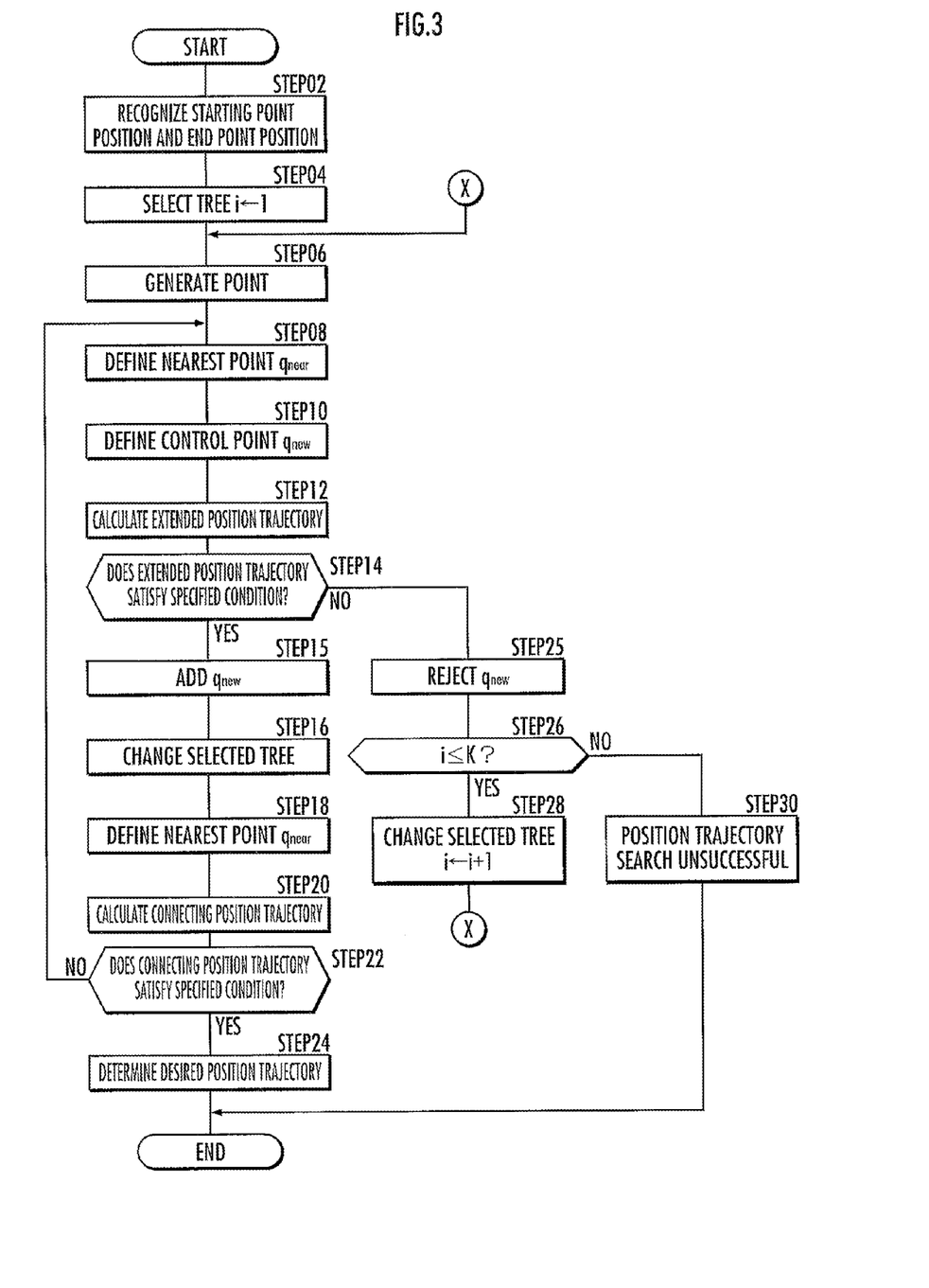
FIG. 3 is a function schematic diagram of the control system.

The first arithmetic processing element 11 recognizes a starting point position and an end point position in a model space (STEP 02 of FIG. 3).

The starting point position corresponds to, for example, the position of one hand H in a state where the robot R holds the cup in a real space. The end point position corresponds to, for example, the position of the hand H at the time when the robot R puts down the cup on the table in the real space.

Each of the starting point position and the end point position may be calculated by the control system 1 on the basis of output signals from the internal state sensor $S_1$ and the external state sensor $S_2$ or may be input to the control system 1 via wireless communication from an external terminal device.

Moreover, either one of the trees on the starting point side and on the end point side is selected (STEP 04 of FIG. 3). In the selection, an index i is initialized to zero, where the index i indicates the number of times there is a change in the selected tree due to a failure in generating an extended position trajectory of a position trajectory described later.

Thereafter, a point (node) q is generated at an arbitrary position according to an RRT algorithm (STEP 06 of FIG. 3). The tree on the starting point side is the epitome of starting point in the initial stage and thereafter gradually grows along with the sequential connection of points q, which are generated in succession so as to spread with the starting point as a reference according to the RRT algorithm (See the dashed lines of FIG. 4(b)). In the same manner, the tree on the end point side is the epitome of end point in the initial stage and thereafter gradually grows along with the sequential connection of points q, which are generated in succession so as to spread with the end point as a reference according to the RRT algorithm (See FIG. 4(b)). An extension process is performed for the corresponding selected tree.

Prior to the extension process, first, a point $q_{near}$, which is the nearest to the point q, is selected from the selected tree (STEP 08 of FIG. 3).

If the point q is distant from the nearest point $q_{near}$ beyond a threshold ϵ, the point q is brought close to the nearest point $q_{near}$ by linear interpolation up to a position of the threshold ϵ, and the closer point q is defined as a current control point $q_{new}$ (STEP 10 of FIG. 3).

Thereafter, for a point sequence, which extends from the root of the selected tree to the nearest point $q_{near}$ and serves as the basis for the past B-spline curve, an interpolation process is performed by using a B-spline curve with a basis of a new point sequence, at the end of which the current control point $q_{new}$ is added. In the B-spline curve extending from the root of the selected tree, a portion extended by adding the current control point $q_{new}$ to the old point sequence is generated as "extended position trajectory" (STEP 12 of FIG. 3).

The B-spline curve x(t) is represented by a linear combination of control point sequences $P_i$ (representing point positions: i=1, 2, —m) with a B-spline basis function $B_{i,N}(t)$, which is normalized as in an expression (01), used as a coupling coefficient. The extended position trajectory is obtained by setting the section of a parameter t on the curve to $[t_{n-N-2}, t_{n-N-1}]$. N indicates an order, n indicates the number of knots, and m indicates the number of control points.

$$x(t)=\Sigma_{i=1-m}B_{i,N}(t)P_i \quad (01)$$

The normalized B-spline basis function $B_{i,N}(t)$ is defined by the following Cox-deBoor recursion formula (02):

$B_{i,1}(t)=1$ (if $t_i < t < t_{i+1}$), 0 (otherwise)

$$B_{i,k}(t)=\{(t-t_i)/(t_{i+k-1}-t_i)\}B_{i,k-1}(t)+\{(t_{i+k}-t)/(t_{i+k}-t_{i+1})\}B_{i+1,k-1}(t) \quad (02)$$

Figure 4:
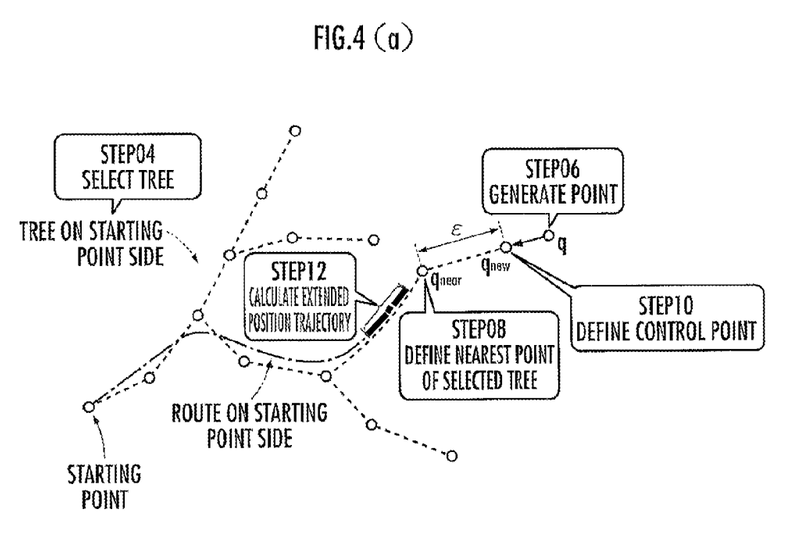
FIG. 4 is an explanatory diagram of a method of generating a desired position trajectory.

This defines, for example, as illustrated in FIG. 4(a), an extended position trajectory (See the thick line), which continues to the previous position trajectory (See the thin line) determined according to the selected tree (the tree on the starting point side).

Further, the first determination process is performed (STEP 14 of FIG. 3). Specifically, it is determined whether the extended position trajectory is outside the obstacle regions, which represent obstacles such as a table and any other cup or the like placed on the table in the real space, and further the extended position trajectory satisfies a specified condition that the position trajectory does not force the robot R to act beyond the allowable range of the joint angles of the robot R. Each of the obstacle regions may be recognized in the position, posture, and shape on the basis of output signals from the external state sensor $S_2$.

If it is determined that the extended position trajectory satisfies the specified condition (STEP 14 of FIG. 3: YES), in other words, if the extension process is successful, the current control point $q_{new}$ or the extended position trajectory up to the control point $q_{new}$ is added to the selected tree (STEP 15 of FIG. 3). Moreover, the previous position trajectory and the extended position trajectory are defined as the current position trajectory, and the current position trajectory is treated as the previous position trajectory in the next extension process. Subsequently to the extension process, a connection process is performed.

Prior to the connection process, first, the selected tree is changed (STEP 16 of FIG. 3). Thereby, if the tree on the starting point side is the previous selected tree, the tree on the end point side is treated as a new selected tree to perform the subsequent processes. Similarly, if the tree on the end point side is the previous selected tree, the tree on the starting point side is treated as a new selected tree to perform the subsequent processes.

In the selected tree, there is selected a point $q_{near}$, which is the nearest to the current control point $q_{new}$ (See STEP 10 of FIG. 3) generated earlier (STEP 18 of FIG. 3).

Thereafter, for a point sequence, which extends from each of the roots of the trees on the starting point side and on the end point side to the nearest point $q_{near}$ and serves as the basis for the previous position trajectory on the starting point side and for the previous position trajectory on the end point side, an interpolation process is performed by using a B-spline curve with a basis of a new point sequence, in the middle of which the current control point $q_{new}$ is added. In the B-spline curve connecting the starting point and the end point, a portion generated by adding the current control point $q_{new}$ to the old point sequence is calculated as "connecting position trajectory" (STEP 20 of FIG. 3).

If the node number of the current control point $q_{new}$ is defined as "i," the connecting position trajectory is obtained by setting the section of the parameter t on the curve to $[t_{i+1}, t_{i+N+1}]$. As illustrated in FIG. 4(b), this generates the connecting position trajectory (See the thick line) that connects a position trajectory on the starting point side (See the alternate long and short dash line) extending from the starting point and a position trajectory on the end point side (See the alternate long and two short dashes line) extending from the end point.

Further, it is determined whether the connecting position trajectory satisfies the specified condition (STEP 22 of FIG. 3).

If it is determined that the connecting position trajectory satisfies the specified condition (STEP 22 of FIG. 3: YES), in other words, if the connection process is successful, the connecting position trajectory and the position trajectorys on the starting point side and on the end point side connected by the connecting position trajectory are generated as a desired position trajectory of the hand H, which is a specified portion of the controlled object extending from the starting point to the end point (STEP 24 of FIG. 3). FIG. 5(a) illustrates the desired position trajectory from the starting point to the end point having been generated so as to avoid the obstacles by using the approach of the present invention.

Then, as illustrated in FIG. 6, the motion of the robot R is controlled so as to displace the hand H according to the desired position trajectory as represented by the curve with an arrow in the real space. This enables robot R to smoothly perform the task of placing the cup held by the hand H on the table while avoiding contact with other objects during motion and preventing the respective joint angles from going out of the allowable range.

On the other hand, unless it is determined that the connecting position trajectory satisfies the specified condition (STEP 22 of FIG. 3: NO), in other words, if the connection process is unsuccessful, the extension process is performed again (See STEP 08 to STEP 14 of FIG. 3).

Further, unless it is determined that the extended position trajectory satisfies the specified condition (STEP 14 of FIG. 3: NO), in other words, if the extension process is unsuccessful, the extended position trajectory up to the current control point $q_{new}$ or the control point $q_{new}$ is rejected, instead of being added to the selected tree (STEP 25 of FIG. 3). Thereafter, it is determined whether the index i is less than or equal to the upper limit K (STEP 26 of FIG. 3).

If it is determined that the index i is less than or equal to the upper limit K (STEP 26 of FIG. 3: YES), the selected tree is changed (STEP 28 of FIG. 3). At this time, the index i is incremented by one. Thereafter, the processes subsequent to the generation of an arbitrary point q (See STEP 06 of FIG. 3) are performed for the selected tree after the change.

If it is determined that the index i exceeds the upper limit K (STEP 26 of FIG. 3: NO), the position trajectory search is recognized to be unsuccessful (STEP 30 of FIG. 3). In response to this, the control system 1 awaits a change of the situation, such that the object moves (recognized through the external state sensor $S_2$), by stopping the motion according to the position trajectory of the robot R or changes the task execution start condition through the motion of the robot R by moving the leg B4 to cause the robot R to move from the spot or by twisting the body B0 on the spot. Thereafter, the control system 1 reruns the position trajectory search as described above.

(Operation and Effect of Control System of the Present Invention)

According to the control system 1 implementing the above functions, the desired position trajectory or a candidate therefor is generated by performing the interpolation process for generating a line segment represented by a linear combination of point sequences disposed in a model space, with the basis function for spatial interpolation used as a coupling coefficient (See the expression (01) and FIGS. 4(a) and 4(b)). Therefore, instead of the broken line passing through a plurality of points disposed in the model space (See FIG. 5(b)), there is generated a line segment continuously or smoothly connecting the starting point and the end point, which is represented by a linear combination of the plurality of points (control points), as a desired position trajectory or a candidate therefor of the controlled object (FIG. 4(b) and FIG. 5(a)). This enables the continuity or smoothness in the motion of the controlled object on the desired position trajectory to be maintained.

OTHER EMBODIMENTS OF THE PRESENT INVENTION

With the first determination process and the second determination process omitted, it may be determined whether the position trajectory, which has been generated at the end of the connection process, satisfies the specified condition, so that the position trajectory is set as the desired position trajectory with a requirement that the determination result is affirmative.

Besides the B-spline curve (See the expression (01)), a Hermite curve defined by an expression (11) or a Bezier curve defined by an expression (21) may be used as a spatial interpolation curve to perform each of the extension process and the connection process.

$$P(t)=(2t^3-3t^2+1)P_{start}+(t^3-2t^2+t)G1_{start}+(-2t^3+3t^2)P_{end}+(t^3-t^2)G1_{end} \quad (11)$$

where $P_{start}$ and $P_{end}$ are position vectors of the endpoints of the curve. In addition, $G1_{start}$ and $G1_{end}$ are tangent vectors (first derivatives) of the curve at the endpoints. Prior to the extension process and the connection process, the sections of the control point sequences $P_i$ (i=1, 2, —m) are interpolated by using the Hermite curve, by which the Hermite curve is applied to RRT-Connect. In this process, $G1_{start}$ and $G1_{end}$ need to be selected in such a way that the continuity of the first derivatives is maintained in the adjacent sections.

$$x(t)=\Sigma_{i=0-m}J_{n,i}(t)P_i \quad (21)$$

where the Bezier basis function (or Bernstein basis function), $J_{n,i}(t)$, is defined by an expression (22).

$$J_{n,i}(t)=n!/\{i!(n-i)!\}t^i(1-t)^{n-i} \quad (22)$$

In principle, the spatial interpolation used in the extension process and the connection process needs to satisfy two conditions: the spatial interpolation forms a line segment represented by a linear combination of point sequences disposed in a model space, with the basis function for spatial interpolation used as a coupling coefficient (first condition); and when a new control point is added to an existing control point sequence, a partial curve generated by existing control points does not change (second condition).

Note that, however, a Bezier curve does not satisfy the second condition, but a plurality of Bezier curves connected to each other can be used as a spatial interpolation curve, with the route point sequence divided into a plurality of sections, similarly to the Hermite curve.

What is claimed is:

1. A control system for controlling a motion of a controlled object, comprising:
   a first arithmetic processing element configured to perform a first extension process by
      defining a new first point sequence by adding a new first point to a previous first point sequence disposed distant from each other in a model space representing a real space, and
      generating a new first line segment represented by a first set of basis functions which use the new first point sequence as control points,
      the new first line segment presently generated being generated by
         calculating, with the first set of basis functions, a first extension line segment that extends from a first line segment previously generated but does not include the new first point, and extending the first line segment previously generated by connecting the first extension line segment to an end of the first line segment previously generated, and the first arithmetic processing element is configured to perform a second extension process by
defining a new second point sequence by adding a new second point to a previous second point sequence disposed distant from each other in the model space, and
generating a new second line segment represented by a second set of basis functions which use the new second point sequence as control points,
the new second line segment presently generated being generated by
calculating, with the second set of basis functions, a second extension line segment that extends from a second line segment previously generated but does not include the new second point, and extending the second line segment previously generated by connecting the second extension line segment to an end of the second line segment previously generated, and
a second arithmetic processing element configured to perform a connection process by
defining a third point sequence by adding a third point to the first point sequence presently generated and the second point sequence presently generated at a position between the first point sequence and the second point sequence, and
generating a desired position trajectory represented by a third set of basis functions which use the third point sequence as control points, the desired position trajectory being generated by
calculating a connection line segment from the third set of basis functions to connect the first line segment presently generated with the second line segment presently generated, and
connecting the connection line segment to the first line segment presently generated and the second line segment presently generated;
wherein the second arithmetic processing element is configured to determine whether the connection line segment satisfies a specified condition including that the connection line segment is outside an object region, which represents an object in the real space, in the model space,
the first arithmetic processing element is configured to perform at least one of the first extension process and the second extension process until the second arithmetic processing element determines the connection line segment satisfies the specified condition, and
the control system controls the motion of the controlled object so as to displace the controlled object or a specified portion thereof according to the desired position trajectory.

2. The control system according to claim 1, wherein the first arithmetic processing element is
configured to determine whether each of the first extension line segment and the second extension line segment satisfies a second specified condition including that the first extension line segment and the second extension line segment are outside the object region in the model space and
configured to alternate between the first extension process after rejecting the second line segment and the second extension process after rejecting the first line segment until the first arithmetic processing element determines each of the first extension line segment and the second extension line segment satisfies the second specified condition.

3. A non-transitory recording medium for a control program causing a computer mounted on a controlled object to function as a system for controlling the motion of the controlled object, wherein the control program causes the computer to perform:
a first arithmetic process of
performing a first extension process by
defining a new first point sequence by adding a new first point to a previous first point sequence disposed distant from each other in a model space representing a real space, and
generating a new first line segment represented by a first set of basis functions which use the new first point sequence as control points,
the new first line segment presently generated being generated by
calculating, with the first set of basis functions, a first extension line segment that extends from a first line segment previously generated but does not include the new first point, and extending the first line segment previously generated by connecting the first extension line segment to an end of the first line segment previously generated, and
performing a second extension process by
defining a new second point sequence by adding a new second point to a previous second point sequence disposed distant from each other in the model space, and
generating a new second line segment represented by a second set of basis functions which use the new second point sequence as control points,
the second line segment presently generated being generated by
calculating, with the second set of basis functions, a second extension line segment that extends from a second line segment previously generated but does not include the new second point, and extending the second line segment previously generated by connecting the second extension line segment to an end of the second line segment previously generated,
a second arithmetic process of performing a connection process by
defining a third point sequence by adding a third point to the first point sequence presently generated and the second point sequence presently generated at a position between the first point sequence and the second point sequence, and
generating desired position trajectory represented by a third set of basis functions which use the third point sequence as control points, the desired position trajectory being generated by
calculating a connection line segment from the third set of basis functions to connect the first line segment presently generated with the second line segment presently generated, and
connecting the connection line segment to the first line segment presently generated and the second line segment presently generated; and
a controlling process of displacing the controlled object or a specified portion thereof according to the desired position trajectory,
wherein the second arithmetic process further includes determining whether the connection line segment satisfies a specified condition including that the connection line segment is outside an object region, which represents an object in the real space, in the model space, and the first arithmetic process further includes performing at least one of the first extension process and the second extension process until the second arithmetic processing element determines the connection line segment satisfies the specified condition.

4. A robot having a body, limbs extended from the body, and a control system for controlling the motion of the robot and configured to perform a task by moving the limbs, wherein the control system includes:

a first arithmetic processing element configured to perform successively a first extension process by defining a new first point sequence by adding a new first point to a previous first point sequence disposed distant from each other in a model space representing a real space, and generating a new first line segment represented by a first set of basis functions which use the new first point sequence as control points, the first line segment presently generated being generated by calculating with the first set of basis functions, a first extension line segment that extends from a first line segment previously generated but does not include the new first point, and extending the first line segment previously generated by connecting the first extension line segment to an end of the first line segment previously generated, and to perform a second extension process by defining a new second point sequence by adding a new second point to a previous second point sequence disposed distant from each other in the model space, and generating a new second line segment represented by a second set of basis functions which use the new second point sequence as control points, the new second line segment presently generated being generated by calculating, with the second set of basis functions, a second extension line segment that extends from a second line segment previously generated but does not include the new second point, and extending the second line segment previously generated by connecting the second extension line segment to an end of the second line segment previously generated, and a second arithmetic processing element configured to perform a connection process by defining a third point sequence by adding a third point to the first point sequence presently generated and the second point sequence presently generated at a position between the first point sequence and the second point sequence, and generating a desired position trajectory represented by a third set of basis functions which use the third point sequence as control points, the desired position trajectory being generated by calculating a connection line segment from the third set of basis functions to connect the first line segment presently generated with the second line segment presently generated, and connecting the connection line segment to the first line segment presently generated and the second line segment presently generated;

wherein the second arithmetic processing element is configured to determine whether the connection line segment satisfies a specified condition including that the connection line segment is outside an object region, which represents an object in the real space, in the model space, the first arithmetic processing element is configured to perform at least one of the first extension process and the second extension process until the second arithmetic processing element determines the connection line segment satisfies the specified condition, and the control system controls the motion of the controlled object so as to displace the controlled object or a specified portion thereof according to the desired position trajectory.

* * * * *